US012476414B2

(12) United States Patent
Ebata et al.

(10) Patent No.: US 12,476,414 B2
(45) Date of Patent: Nov. 18, 2025

(54) WIRING MEMBER

(71) Applicants: SUMITOMO WIRING SYSTEMS, LTD., Mie (JP); TOYOTA JIDOSHA KABUSHIKI KAISHA, Aichi (JP)

(72) Inventors: Daisuke Ebata, Mie (JP); Takuya Kaba, Mie (JP); Tetsuya Nishimura, Mie (JP); Yusuke Mitani, Mie (JP); Masaki Mizushita, Mie (JP); Itsuo Wakabayashi, Aichi (JP)

(73) Assignees: SUMITOMO WIRING SYSTEMS, LTD., Mie (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 319 days.

(21) Appl. No.: 18/028,091

(22) PCT Filed: Sep. 17, 2021

(86) PCT No.: PCT/JP2021/034348
§ 371 (c)(1),
(2) Date: Mar. 23, 2023

(87) PCT Pub. No.: WO2022/075044
PCT Pub. Date: Apr. 14, 2022

(65) Prior Publication Data

US 2023/0335942 A1 Oct. 19, 2023

(30) Foreign Application Priority Data

Oct. 7, 2020 (JP) ................................ 2020-169773

(51) Int. Cl.
*H01R 13/52* (2006.01)
*H01B 7/18* (2006.01)
*H01R 4/18* (2006.01)

(52) U.S. Cl.
CPC .......... *H01R 13/5221* (2013.01); *H01B 7/18* (2013.01); *H01R 4/185* (2013.01); *H01R 13/5216* (2013.01)

(58) Field of Classification Search
CPC .......... H01R 13/5221; H01R 13/5216; H01R 13/52; H01R 13/521; H01R 13/5202;
(Continued)

(56) References Cited

U.S. PATENT DOCUMENTS 5,231,255 A * 7/1993 Reichensperger .......................... H01R 13/5216 200/84 R
5,928,033 A 7/1999 Kato et al.
(Continued)

FOREIGN PATENT DOCUMENTS

CN 1186360 7/1998
CN 103339805 10/2013
(Continued)

OTHER PUBLICATIONS

EuroPlas table showing melting point ranges of Polystyrene vs Polypropylene: https://europlas.com.vn/en-US/blog-1/polystyrene-vs-polypropylene-which-one-is-stronger#:~:text=Polystyrene%20is%20a%20thermoplastic%20polymer,464%20to%20500%20degrees%20Fahrenheit). (Year: 2025).*
(Continued)

*Primary Examiner* — Christopher M Koehler
*Assistant Examiner* — Gregory L Mangot
(74) *Attorney, Agent, or Firm* — Greenblum & Bernstein, P.L.C.

(57) ABSTRACT

A wiring member includes: a sheet including a fusion layer; a wire-like transmission member fused to the fusion layer; a connector housing in which a cavity housing an end portion of the wire-like transmission member is formed; and a water
(Continued)

stop member stopping water between a wall part of the cavity and the end portion of the wire-like transmission member. The water stop member includes an inner portion located in the cavity and an outer portion continuing into the inner portion to be located on an outer side of the cavity. Provided to the inner portion is a filling portion made up of a resin material thermally deformed to fill the cavity.

7 Claims, 9 Drawing Sheets

(58) Field of Classification Search
CPC ............ H01R 13/5205; H01R 13/5208; H01R 33/965; H01B 7/2825
USPC .......................................................... 439/587
See application file for complete search history.

(56) References Cited

U.S. PATENT DOCUMENTS

| | | | | |
|---|---|---|---|---|
| 2013/0303019 | A1 | 11/2013 | Ito et al. | |
| 2020/0251249 | A1* | 8/2020 | Uegaki | H01B 11/12 |

FOREIGN PATENT DOCUMENTS

| | | |
|---|---|---|
| JP | 2002-305065 | 10/2002 |
| JP | 2011-146206 | 7/2011 |
| JP | 2015-220163 | 12/2015 |
| JP | 2016-201330 | 12/2016 |

OTHER PUBLICATIONS

Xometry table agreeing with EuroPlas table: https://www.xometry.com/resources/materials/polypropylene-vs-polystyrene/ (Year: 2024).*
International Search Report issued in International Patent Application No. PCT/JP2021/034348, dated Nov. 9, 2021, along with an English translation thereof.
Office Action issued in China Patent Application No. 202180064744.8, dated Jun. 14, 2025, together with English language translation thereof.

* cited by examiner

WIRING MEMBER

TECHNICAL FIELD

The present disclosure relates to a wiring member.

BACKGROUND ART

Ingress of water through a cavity is suppressed in a connector in some cases. In this case, a rubber plug put on an end portion of an electrical wire is firmly attached to an inner surface of the cavity in some cases as with a waterproof connector described in Patent Document 1, for example.

PRIOR ART DOCUMENTS

Patent Document(s)

Patent Document 1: Japanese Patent Application Laid-Open No. 2011-146206

SUMMARY

Problem to be Solved by the Invention

It is also desired that ingress of water through a cavity is suppressed in a connector without using a rubber plug.

Accordingly, an object is to provide a technique capable of making a connector waterproof without using a rubber plug.

Means to Solve the Problem

A wiring member according to the present disclosure is a wiring member including: a sheet including a fusion layer; a wire-like transmission member fused to the fusion layer; a connector housing in which a cavity housing an end portion of the wire-like transmission member is formed; and a water stop member stopping water between a wall part of the cavity and the end portion of the wire-like transmission member, wherein the water stop member includes an inner portion located in the cavity and an outer portion continuing into the inner portion to be located on an outer side of the cavity, provided to the inner portion is a filling portion made up of a resin material thermally deformed to fill the cavity, and the outer portion is connected to the sheet.

Effects of the Invention

According to the present disclosure, a connector can be made to be waterproof without using a rubber plug.

DESCRIPTION OF EMBODIMENT(S)

Description of Embodiment of Present Disclosure

Figure 1:
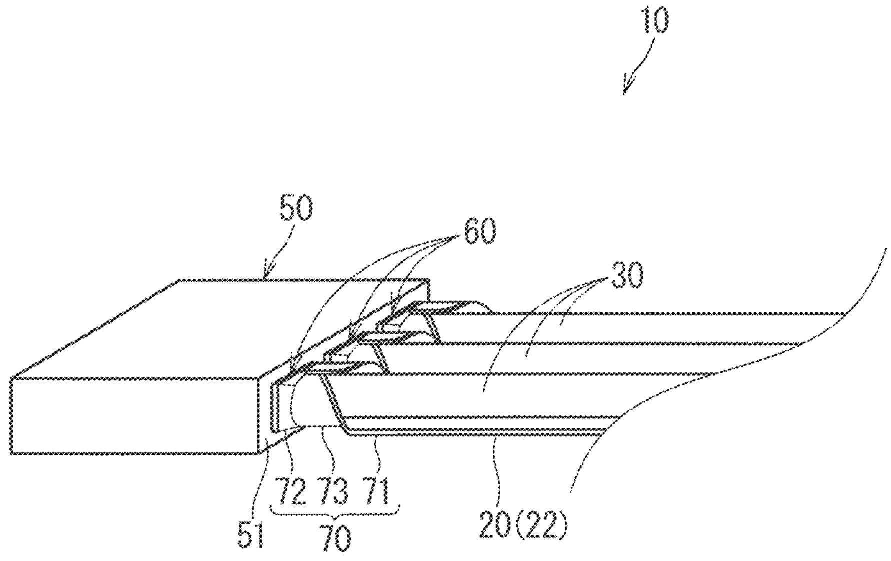
FIG. 1 is a perspective view illustrating a wiring member according to an embodiment 1.

Embodiments of the present disclosure are listed and described firstly.

A wiring member according to the present disclosure is as follows.

(1) A wiring member includes: a sheet including a fusion layer; a wire-like transmission member fused to the fusion layer; a connector housing in which a cavity housing an end portion of the wire-like transmission member is formed; and a water stop member stopping water between a wall part of the cavity and the end portion of the wire-like transmission member, wherein the water stop member includes an inner portion located in the cavity and an outer portion continuing into the inner portion to be located on an outer side of the cavity, provided to the inner portion is a filling portion made up of a resin material thermally deformed to fill the cavity, and the outer portion is connected to the sheet. The water stop member is provided, thus the connector can be made to be waterproof without using a rubber plug. The water stop member is connected to the sheet, thus when force is applied to the wire-like transmission member in a direction of pulling the wire-like transmission member out of the cavity, force applied to the end portion of the wire-like transmission member is easily diffused, and concentration of stress hardly occurs in a specific position such as a locking part.

(2) It is also applicable that in the wiring member according to (1), provided is a terminal crimping part in which a terminal is crimped to the end portion of the wire-like transmission member, the terminal crimping part includes a covering crimping part in which an insulation barrel in the terminal is crimped to a covering layer in the wire-like transmission member, and the inner portion includes an intervention part intervening between the insulation barrel and the covering layer in the covering crimping part. Accordingly, the filling portion hardly comes out of the cavity.

(3) In the wiring member according to (1) or (2), a melting point of the water stop member may be lower than a melting point of the covering layer of the wire-like transmission member. Accordingly, a filling material can be melted without melting the covering layer as much as possible at a time of heating the filling material.

(4) In the wiring member according to any one of (1) to (3), a melting point of the water stop member may be lower than a melting point of the fusion layer. Accordingly, a filling material can be melted without melting the fusion layer as much as possible at a time of heating the filling material.

(5) In the wiring member according to any one of (1) to (4), a boundary portion between the inner portion and the outer portion may have an outer shape corresponding to an inner surface of the cavity. Accordingly, it is easily confirmed that the filling portion is provided.

(6) In the wiring member according to any one of (1) to (5), the water stop member may be a partially-extended part of the fusion layer. Accordingly, the fusion layer and the water stop member need not be provided as different members, thus reduction in the number of the members is achieved.

(7) In the wiring member according to any one of (1) to (5), it is also applicable that the water stop member is a member different from the fusion layer, and the outer portion is bonded to the sheet. Accordingly, a physical property of the water stop member and a physical property of the fusion layer can be easily made to be different from each other, thus a material suitable for each member is easily selected.

Detailed Description of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
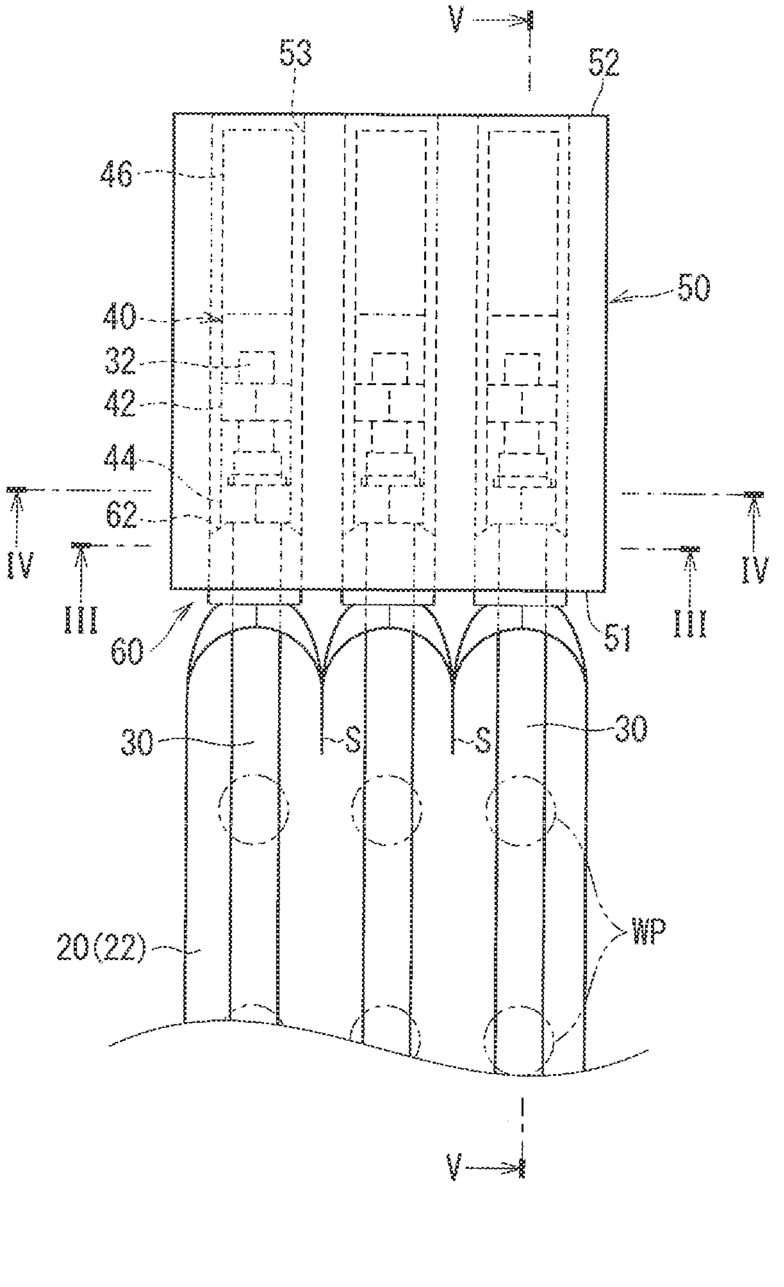
FIG. 2 is a plan view illustrating a wiring member according to an embodiment 1.
Figure 3:
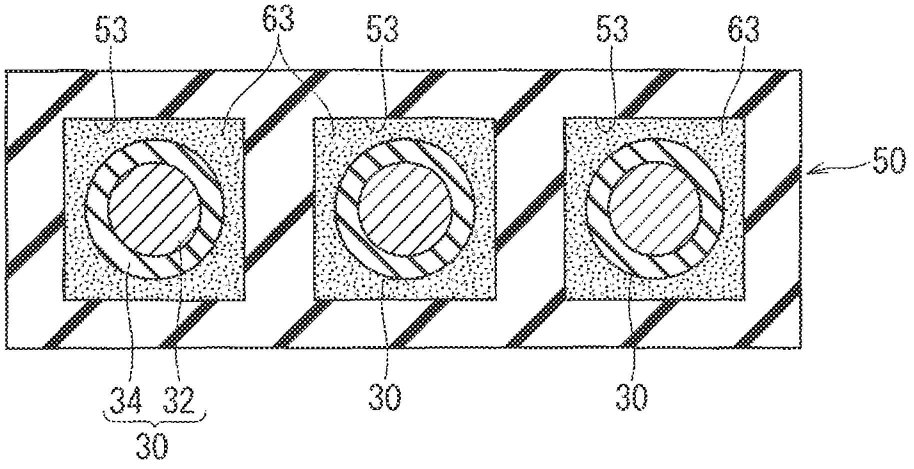
FIG. 3 is a cross-sectional view of the wiring member cut along a III-III line in FIG. 2.
Figure 4:
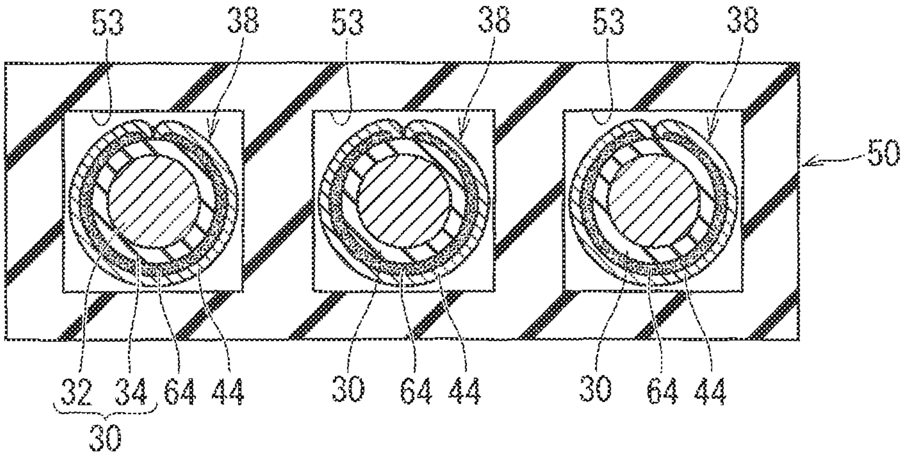
FIG. 4 is a cross-sectional view of the wiring member cut along a IV-IV line in FIG. 2.
Figure 5:
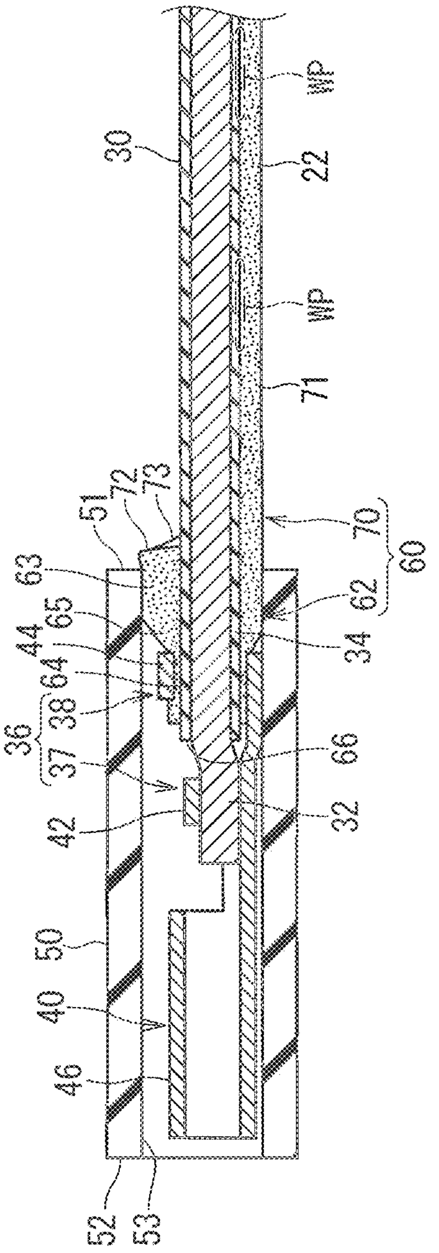
FIG. 5 is a cross-sectional view of the wiring member cut along a V-V line in FIG. 2.

A wiring member according to an embodiment 1 is described hereinafter. FIG. 1 is perspective view illustrating a wiring member 10 according to the embodiment 1. FIG. 2 is a plan view illustrating the wiring member 10 according to the embodiment 1. FIG. 3 is a cross-sectional view of the wiring member cut along a III-III line in FIG. 2. FIG. 4 is a cross-sectional view of the wiring member cut along a IV-IV line in FIG. 2. FIG. 5 is a cross-sectional view of the wiring member cut along a V-V line in FIG. 2.

The wiring member 10 includes a sheet 20, a wire-like transmission member 30, a connector housing 50, and a water stop member 60.

The sheet 20 includes a fusion layer 22. The fusion layer 22 is a layer which can be fused to a covering layer 34 of the wire-like transmission member 30. The fusion layer 22 includes a resin material, or preferably includes a thermoplastic resin material. The resin material of the fusion layer 22 is softened and fused to a fusion target. A type of the resin material is not particularly limited, but polyvinyl chloride (PVC), polyethylene (PE), polypropylene (PP), or polyethylene terephthalate (PET) can be adopted, for example. The fusion layer 22 and the covering layer 34 preferably include the same type resin material.

A structure of the fusion layer 22 is not particularly limited. For example, the fusion layer 22 may be a sheet having an evenly filled cross-sectional surface (also referred to as a non-foam sheet or a solid sheet, for example). The fusion layer 22 is also considered a foam sheet, for example. The fusion layer 22 is also considered a fibrous material sheet such as a braided cloth, a woven cloth, or a non-woven cloth, for example.

Herein, the sheet 20 has a single layer structure of only the fusion layer 22. The sheet may also have a multilayer structure of the fusion layer 22 with an additional layer thereon. When the sheet has the multilayer structure of the fusion layer 22 and the additional layer, the fusion layer 22 is preferably located at least on one main surface of the sheet. The additional layer is formed of a material different from that of the fusion layer 22, or has a different structure. The additional layer increases a function of the fusion layer 22, or adds a function which the fusion layer 22 does not have to the sheet 20. A material constituting the additional layer is a material described for the fusion layer 22 described above or metal, for example. A structure of the additional layer may be any of the structure described for the fusion layer 22 described above. The additional layer may made up of a single layer or two or more layers.

The fusion layer 22 and the additional layer are fixed to each other while a surface of the fusion layer 22 and a surface of the additional layer have contact with each other. A fixing state of the fusion layer 22 and the additional layer is not particularly limited, however, fixing by fusion or adhesion is preferable. For example, when at least one of the fusion layer 22 and the additional layer is a sheet having voids in a surface such as a fibrous material sheet or a foam sheet, a resin material or an adhesive agent enters the voids and the layers can be fixed to each other. Such a configuration causes so-called anchor effect, thus the fusion layer 22 and the additional layer are rigidly fixed. For example, it is also applicable that the fusion layer 22 is a solid sheet made up of resin, the additional layer is a fibrous sheet such as a non-woven sheet, and the fusion layer 22 and the additional layer are fused so that a material of the fusion layer 22 fills a part of voids of the additional layer.

The fusion layer 22 and the additional layer may be formed to have the same size (the same planar shape). One of the fusion layer 22 and the additional layer may also be formed to be larger than the other one thereof. The fusion layer 22 and the additional layer may be wholly fixed at a region where they have contact with each other. The fusion layer 22 and the additional layer may also be fixed only at a part of a region where they have contact with each other.

The sheet 20 may be a flexible member. The sheet 20 may have a plastic property so as to be able to follow bending of the wire-like transmission member 30. It is also applicable that the sheet 20 is easily bended in a thickness direction (bended along an axis parallel to a main surface of the sheet 20) and is hardly bended in a direction intersecting with the thickness direction (bended along an axis perpendicular to the main surface of the sheet 20) in a state where the sheet 20 is developed.

The wire-like transmission member 30 is disposed on the fusion layer 22 of the sheet 20. The wire-like transmission member 30 is fused to the fusion layer 22. Accordingly, the wire-like transmission member 30 is kept in a state of being disposed along a predetermined route on the sheet 20. The predetermined route of the wire-like transmission member 30 on the sheet 20 is a route corresponding to a wiring route of the wire-like transmission member 30 in a vehicle, for example. In this manner, the wire-like transmission member 30 is held by the sheet 20 in a state of extending to correspond to the route in the vehicle, thus the wire-like transmission member 30 is easily disposed long a predetermined wiring route when the wiring member 10 is assembled to the vehicle.

The predetermined route of the wire-like transmission member 30 on the sheet 20 includes one of or both a straight section and a bending section. The predetermined route of the wire-like transmission member 30 on the sheet 20 preferably includes two straight sections and a bending section therebetween. When the plurality of wire-like transmission members 30 are included, it is also applicable that all routes of the plurality of wire-like transmission members 30 are the same, or routes of some of the wire-like transmission members 30 are different from those of the other some of the wire-like transmission members 30. When the routes of some of the wire-like transmission members 30 are different from those of the other some of the wire-like transmission members 30, a branch part where some of the wire-like transmission members 30 are branched from the other some of the wire-like transmission members 30 may be provided on the sheet 20. The branch part is provided on the sheet 20, thus a portion including the branch part can also be held in the predetermined route. When the plurality of wire-like transmission members 30 are included, an intersection part where the wire-like transmission members 30 intersect with each other may be provided on the sheet.

A planar shape of the sheet 20 is preferably formed into a shape corresponding to the predetermined route of the wire-like transmission member 30 on the sheet 20. When the predetermined route of the wire-like transmission member 30 includes the bending section, the planar shape of the sheet 20 is also preferably bended in accordance with the bending section. When the predetermined route of the wire-like transmission member 30 includes the branch part, the planar shape of the sheet 20 is also preferably branched in accordance with the branch part. The sheet 20 is preferably formed so that a dimension thereof along an extension direction of the wire-like transmission member 30 is larger than that along a width direction of the wire-like transmission member 30.

FIG. 2 and FIG. 5 illustrate the sheet 20, the wire-like transmission member 30, and a fusion part WP. In FIG. 2 and FIG. 5, the fusion parts WP are provided in a plurality of positions at intervals along the extension direction of the wire-like transmission member 30. Each fusion part WP is a spot fusion part having a short side in the extension direction of the wire-like transmission member 30. The fusion part WP may be sequentially provided along the extension direction of the wire-like transmission member 30.

The wire-like transmission member 30 is a member transmitting electrical power or light. For example, the wire-like transmission member 30 is an electrical wire 30 transmitting electrical power or an optical fiber cable transmitting light. The wire-like transmission member 30 includes a transmission wire body 32 and a covering layer 34. The transmission wire body is a portion transmitting electrical power or light. The transmission wire body 32 is a core wire 32 made up of a conductor in the covering electrical wire 30 or a core and a clad in an optical fiber cable, for example. The covering layer 34 is a member covering a periphery the transmission wire body 32. The covering layer 34 is formed of resin such as PVC or PE extrusion molded around the transmission wire body 32, for example. One wire-like transmission member may include a single transmission wire body or a plurality of transmission wire bodies. The wire-like transmission member may be a single wire-like object or a composite object of a plurality of wire-like objects (a twisted wire and a cable made up of a plurality of wire-like objects covered by a sheath). In the description hereinafter, the wire-like transmission member 30 is a covering electrical wire 30 (simply referred to as the electrical wire 30 hereinafter).

A terminal crimping part 36 is provided to an end portion of the electrical wire 30. The terminal crimping part 36 is a portion where the terminal 40 crimped to the electrical wire 30. The terminal crimping part 36 includes a core wire crimping part 37 and a covering crimping part 38. More specifically, the core wire 32 is exposed from the covering layer 34 in the end portion of the electrical wire 30. The terminal 40 is formed by bending and deforming a plate material having conductivity, for example. The terminal 40 includes a wire barrel 42, an insulation barrel 44, and the other side connection part 46. The wire barrel 42 is a portion crimped to the core wire 32 exposed from the covering layer 34. The portion of the wire barrel 42 crimped to the core wire 32 is the core wire crimping part 37. The electrical wire 30 and the terminal 40 are electrically connected via the core wire crimping part 37. The insulation barrel 44 is a portion crimped to the covering layer 34. The portion of the insulation barrel 44 crimped to the covering layer 34 is the covering crimping part 38. The other side connection part 46 is a portion electrically connected to the other side conductor. Herein, the other side connection part 46 is formed into a female terminal shape. Needless to say, the other side connection part 46 may be formed into a male terminal shape, for example.

The connector housing 50 is a molded member made up of resin such as polybutylene terephthalate (PBT) having insulation properties, for example, as a material. A cavity 53 is formed to pass through one main surface 51 and the other main surface 52 in the connector housing 50. Accordingly, the cavity 53 has an opening in each of one main surface 51 and the other main surface 52 of the connector housing 50. The opening of the cavity 53 in one main surface 51 of the connector housing 50 is referred to as one side opening, and the opening of the cavity 53 in the other main surface 52 of the connector housing 50 is referred to as the other side opening in some cases.

The end portion of the wire-like transmission member 30 is housed in the cavity 53. The end portion of the wire-like transmission member 30 is inserted into the cavity 53 from one side opening. The terminal crimping part 36 is housed in a side of one side opening of the cavity 53. Furthermore, herein, a part of covering layer 34 extending from the terminal crimping part 36 is housed in the side of one side opening of the cavity 53. When the other side connection part 46 has the female terminal shape, the other side connection part 46 is generally housed in the cavity 53, and does not protrude from the other side opening. Alternatively, a male terminal on the other side is inserted into the cavity 53 from the other side opening, and has contact with the other side connection part 46 as a female terminal, thus they are electrically connected to each other. When the other side connection part has the male terminal shape, the other side connection part generally protrudes to an outer side of the cavity 53 from the other side opening.

The water stop member 60 fills a portion between a wall part of the cavity 53 and the end portion of the wire-like transmission member 30. The water stop member 60 includes an inner portion 62 and an outer portion 70. The inner portion 62 is a portion located in an inner part of the cavity 53. The outer portion 70 is a portion located in an outer part of the cavity 53. The inner portion 62 and the outer portion 70 are connected to each other. The water stop member 60 is sectioned into the inner portion 62 and the outer portion 70 in one side opening of the cavity 53 as a boundary.

The inner portion 62 includes a filling part 63. Herein, the inner portion 62 further includes an intervention part 64, a joining part 65, and a protrusion part 66. Some or all of the intervention part 64, the joining part 65, and the protrusion part 66 may be omitted.

The filling part 63 is a portion made up of a resin material thermally deformed to fill the cavity 53. Herein, the filling part 63 is provided on the side of one side opening of the cavity 53. Particularly, the filling part 63 herein fills a portion between the wall part of the cavity 53 and the covering layer 34 in a portion of the cavity 53 where a part of the covering layer 34 extending from the terminal crimping part 36 is housed. The filling part 63 may fill a portion between the wall part of the cavity 53 and the terminal crimping part 36 in a portion of the cavity 53 where the terminal crimping part 36 is housed. The filling part 63 reaches one side opening of the cavity 53. The filling part 63 of the inner portion 62 is continuously formed with the outer portion 70.

The intervention part 64 is a portion intervening between the insulation barrel 44 and the covering layer 34 in the covering crimping part 38. Herein, in a portion where the intervention part 64 is located, a gap is located between the insulation barrel 44 and the wall part of the cavity 53, thus the filling part 63 is not located. The intervention part 64 continues into a side of the other side opening of the cavity 53 instead of the filling part 63. The portion where the intervention part 64 is located may be the filling part 63.

The joining part 65 is a portion between the filling part 63 and the intervention part 64, and is a portion connecting the filling part 63 and the intervention part 64. The joining part 65 covers the covering layer 34 extending from the terminal crimping part 36 in a position closer to the terminal crimping part 36 than the filling part 63. A gap is located between the covering layer 34 and the cavity 53 in a position of the joining part 65, thus the filling part 63 is not located. It is also applicable that the joining part 65 is omitted, and the filling part 63 and the intervention part 64 are directly connected to each other.

The protrusion part 66 is a portion protruding to a side of the wire barrel 42 with respect to the intervention part 64. The protrusion part 66 does not preferably reach the core wire crimping part 37. It is preferable that the protrusion part 66 does not reach the core wire 32 exposed from the end portion of the covering layer 34, but remains in the end portion of the covering layer 34.

The outer portion 70 is a portion extending to the outer side of the cavity 53 from the inner portion 62. One end portion 71 of the outer portion 70 is connected to the sheet 20. The other end portion 72 of the outer portion 70 is connected to the inner portion 62 (herein, the filling part 63). Herein, the water stop member 60 is a partially-extended part of the fusion layer 22. Accordingly, there is no joining surface in one end portion 71 of the outer portion 70 and the fusion layer 22. The water stop member 60 is a part of one base material B (refer FIG. 6) described hereinafter, and the fusion layer 22 is the other part of the base material B. Herein, the plurality of electrical wires 30 are fused to the fusion layer 22. A slit S is formed between the plurality of electrical wires 30 from an edge portion toward an intermediate portion of the base material B in the base material B. It is also applicable that a portion of the base material B where the slit S is formed to divide the base material B for each electrical wire 30 is the water stop member 60 and a portion thereof with no slit S is the fusion layer 22. It is also applicable that one base material B is sectioned into the fusion layer 22 and the water stop member 60 in an end portion of the slit S as a boundary.

A boundary portion between the inner portion 62 and the outer portion 70 has an outer shape corresponding to the inner surface of the cavity 53. Herein, the inner surface of the cavity 53 has a quadrangular shape, thus the outer shape of the boundary portion between the inner portion 62 and the outer portion 70 also has a quadrangular shape. The other end portion 72 of the outer portion 70 protrudes to the outer side of the cavity 53 while keeping the shape of the filling part 63. The other end portion 72 of the outer portion 70 may have an outer shape larger than an inner surface shape of the cavity 53. In this case, the other end portion 72 of the outer portion 70 may have contact with the edge portion of one side opening of the cavity 53 in one main surface 51 of the connector housing 50.

One end portion 71 of the outer portion 70 keeps a flat sheet-like shape in the manner similar to the fusion layer 22, and covers only one side of the wire-like transmission member 30. The other end portion 72 of the outer portion 70 covers a whole periphery of the wire-like transmission member 30 in the manner similar to the filling part 63. An intermediate portion 73 of the outer portion 70 is a transition portion of transitioning from the shape of one end portion 71 (flat sheet-like shape) to the shape of the other end portion 72 (shape surrounding the whole periphery of the wire-like transmission member 30). That is to say, the intermediate portion 73 of the outer portion 70 gradually increases a region covering the periphery of the wire-like transmission member 30 from a state of covering only one side of the wire-like transmission member 30 on a side of one end portion 71 toward a state of covering the whole periphery of the wire-like transmission member 30 on a side of the other end portion 72. One side portion and the other side portion of the base material B are fused to each other in the other end portion 72 of the joining part.

<Manufacturing Method>

An example of a method of manufacturing the wiring member 10 is described with reference to FIG. 6 to FIG. 9. FIG. 6 to FIG. 9 are schematic diagrams each illustrating a manufacture of the wiring member 10 according to the embodiment 1.

Figure 6:
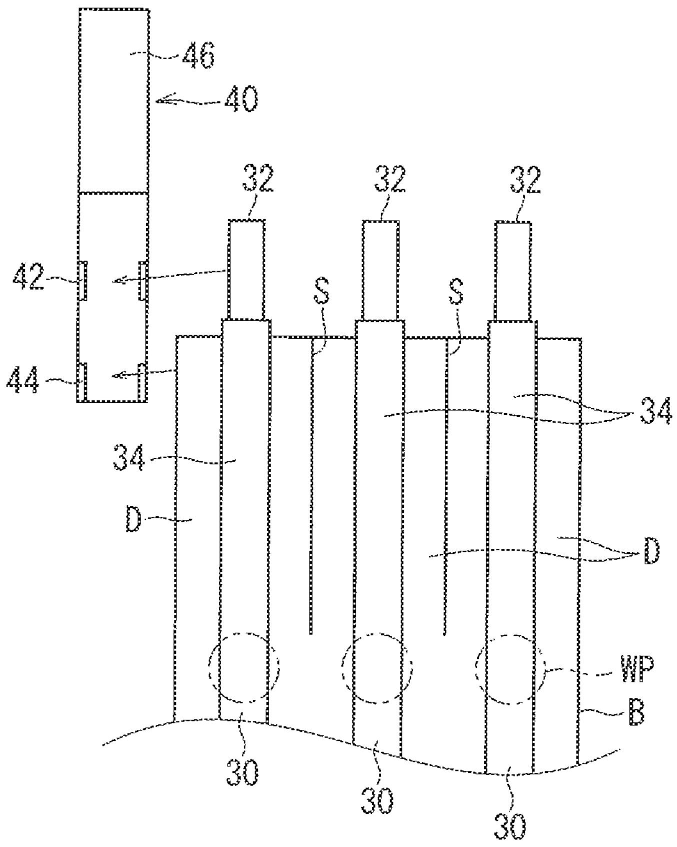
FIG. 6 is a schematic diagram illustrating a manufacture of the wiring member according to the embodiment 1.

Firstly, as illustrated in FIG. 6, the electrical wire 30 fused to the sheet-like base material B is prepared. The base material B is a portion to be eventually the water stop member 60 and the sheet 20. The slit S is formed between the plurality of electrical wires 30 in the end portion of the base material B. Accordingly, the end portion of the base material B can be divided into a plurality of divided portions D. Each divided portion D serves as the water stop member 60 for each electrical wire 30. The divided portion D and the electrical wire 30 are not fused to each other, however, the divided portion D and the electrical wire 30 may be fused to each other. A portion of the divided portion D fused to the electrical wire 30 may be kept in a fused state even after the divided portion D becomes the water stop member 60. For example, one of or both the inner portion 62 and the outer portion 70 of the water stop member 60 may be fused to the electrical wire 30. The end portion of the electrical wire 30 extends to an outer side from an end portion of the divided portion D. The covering layer 34 is partially peeled in the end portion of the electrical wire 30, thus the core wire 32 is exposed. The terminal 40 is crimped to the end portion of the electrical wire 30 in this state.

Figure 7:
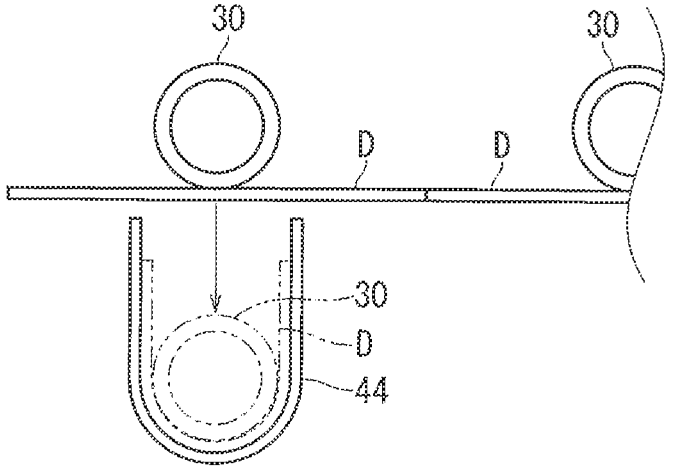
FIG. 7 is a schematic diagram illustrating a manufacture of the wiring member according to the embodiment 1.

When the terminal 40 is crimped to the end portion of the electrical wire 30, as illustrated in FIG. 7, the end portion of the divided portion D is also housed in the insulation barrel 44 together with the covering layer 34. At this time, a part of the divided portion D in a width direction (an intermediate portion in a width direction in FIG. 7) is sandwiched between the insulation barrel 44 and the covering layer 34. The other part of the divided portion D in the width direction (one end portion and the other end portion in the width direction in FIG. 7) extends along the insulation barrel 44 or the electrical wire 30. Then, the insulation barrel 44 is swaged and deformed to be crimped to the covering layer 34 in this state, thus the other part of the divided portion D is also sandwiched between the insulation barrel 44 and the covering layer 34. Accordingly, the divided portion D is kept in a state of being wound around the electrical wire 30. The divided portion D may be formed so that a width dimension thereof is equal to or longer than a perimeter of the electrical wire 30 to cover the whole periphery of the electrical wire 30. It is also applicable that the divided portion D may be formed so that a width dimension thereof is shorter than a perimeter of the electrical wire 30 to partially cover the periphery of the electrical wire 30, and the one side portion and the other side portion of the divided portion D are separated from each other.

Figure 8:
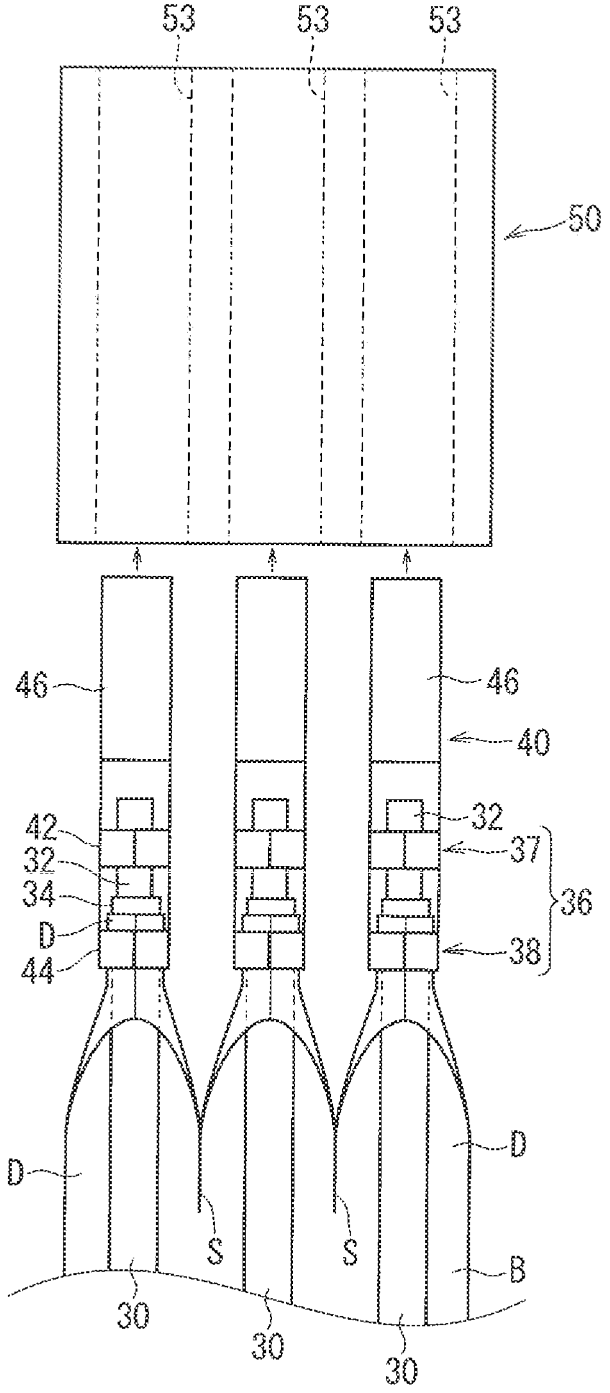
FIG. 8 is a schematic diagram illustrating a manufacture of the wiring member according to the embodiment 1.

At this time, as illustrated in FIG. 8, the divided portion D gradually increases a region covering the periphery of the wire-like transmission member 30 from a flat state of covering only one side of the wire-like transmission member 30 in a midway portion from the end portion of the slit S toward the covering crimping part 38. A tip end portion of the divided portion D may slightly protrude to a side of the wire barrel 42 with respect to the insulation barrel 44.

The end portion of the electrical wire 30 to which the terminal 40 is crimped is inserted into the cavity 53 from one side opening of the cavity 53. The end portion of the electrical wire 30 is inserted to reach a position of the covering layer 34 beyond the terminal crimping part 36. At this time, the divided portion D is kept in the state of being wound around the electrical wire 30 by the covering crimping part 38, thus a portion of the divided portion D covering the covering layer 34 is also inserted while being kept in a state of surrounding the periphery of the electrical wire 30 to some extent as illustrated in FIG. 9.

Figure 9:
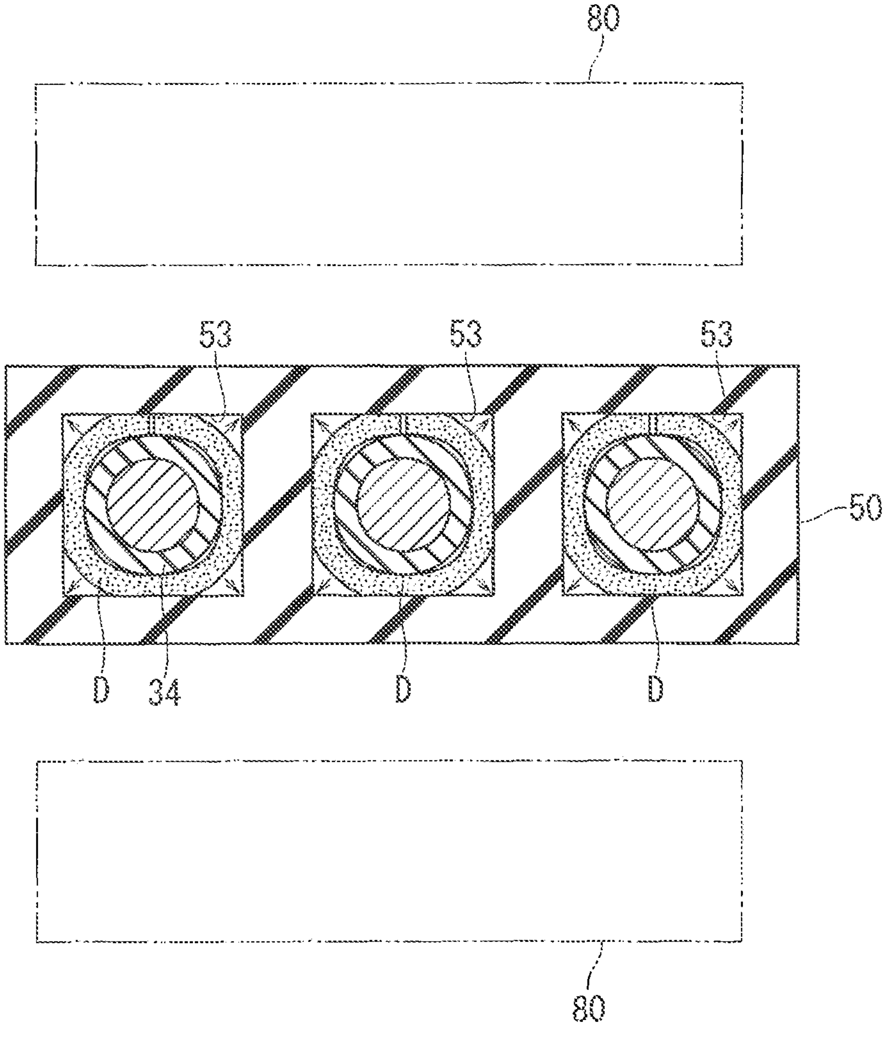
FIG. 9 is a schematic diagram illustrating a manufacture of the wiring member according to the embodiment 1.

In a state immediately after the end portion of the electrical wire 30 is inserted to reach a predetermined position in the cavity 53, as illustrated in FIG. 9, a gap occurs between the divided portion D and the wall part of the cavity 53 and between the divided portion D and the covering layer 34, for example. The divided portion D in the cavity 53 is heated to fill this gap. A method of heating the divided portion D is not particularly limited, however, the divided portion D in the cavity 53 may be heated by hot-air heating the divided portion D from an outer side of the connector housing 50 toward one side opening of the cavity 53 using a heating device 80. It is also applicable that the connector housing 50 is heated, and the base material B in the cavity 53 is heated by heat conduction from the connector housing 50, for example.

The heated divided portion D in the cavity 53 is eventually softened, and as shown by an arrow in FIG. 9, the softened divided portion D flows to fill the gap between the divided portion D and the wall part of the cavity 53 and between the divided portion D and the covering layer 34, for example. The divided portion D is firmly attached to the wall part of the cavity 53 and the covering layer 34, and then hardened, thereby forming the filling part 63 as illustrated in FIG. 3.

A range of the divided portion D softened and flowing is determined in accordance with a heating condition, for example, and a shape of a portion of the inner portion 62 except for the filling part 63 is not particularly limited as long as prevented is a shape thereof interfering with at least an electrical connection between the other side connection part 46 and the other side conductor and an electrical connection between the wire barrel 42 and the core wire 32 made up of a conductor. For example, the portion of the inner portion 62 except for the filling part 63 may include a portion where one side portion and the other side portion of the divided portion D are fused in the manner similar to the filling part 63. The portion of the inner portion 62 except for the filling part 63 may include a portion where one side portion and the other side portion of the divided portion D are not fused but remain as they are.

When the divided portion D in the cavity 53 is softened and flows to be the filling part 63, the divided portion D on an outer side of the cavity 53 may be also softened and flow. Thus, the shape of the other end portion 72 of the outer portion 70 is also determined in accordance with a heating condition, for example. In the other end portion 72 of the outer portion 70, a portion of the divided portion D where one side portion and the other side portion are overlapped with each other may be wholly fused to each other. The other end portion 72 of the outer portion 70 may include a portion where one side portion and the other side portion of the divided portion D are overlapped with each other, but are not fused but remain as they are.

A melting point of the water stop member 60 (base material B) is not particularly limited, but is preferably lower than that of the connector housing 50. For example, resin of the water stop member 60 is PVC or PE, and resin of the connector housing 50 is PBT, thus the melting point of the water stop member 60 is lower than that of the connector housing 50.

The melting point of the water stop member 60 may be lower than that of the covering layer 34 of the wire-like transmission member 30. Herein, the water stop member 60 is a portion extended from the fusion layer 22, and the water stop member 60 and the fusion layer 22 may be formed by the same resin material as a base. The fusion layer 22 and the covering layer 34 may also be formed by the same resin material as a base. Accordingly, the water stop member 60 and the covering layer 34 may be made up of the same resin material. In this case, for example, it is considered that a type and a component of an additive agent is changed between the base material B before being processed to be eventually the fusion layer 22 and the water stop member 60 and the covering layer 34 to make the melting point of the water stop member 60 be lower than that of the covering layer 34.

Effect Etc. of Embodiment 1

According to the wiring member 10 having the configuration described above, the water stop member 60 is provided, thus the connector can be made to be waterproof without using a rubber plug. More specifically, an outer surface of the filling part 63 is firmly attached to a whole perimeter of the wall part of the cavity 53, and an inner surface of the filling part 63 is firmly attached to a whole perimeter of the covering layer 34. Accordingly, suppressed is ingress of water from a portion between the wall part of the cavity 53 and the filling part 63 and between the covering layer 34 and the filling part 63 in a portion where the filling part 63 is provided.

It is sufficient that the filling part 63 is firmly attached to the wall part of the cavity 53, thus needs not be bonded thereto. The filling part 63 may be bonded to the wall part of the cavity 53. When the filling part 63 is bonded to the wall part of the cavity 53, ingress of water from a portion between the wall part of the cavity 53 and the filling part 63 is further suppressed. In the similar manner, it is sufficient that the filling part 63 is firmly attached to the outer surface of the covering layer 34, thus needs not be bonded thereto. The filling part 63 may be bonded to the outer surface of the covering layer 34. When the filling part 63 is bonded to the outer surface of the covering layer 34, ingress of water from a portion between the outer surface of the covering layer 34 and the filling part 63 is further suppressed. The filling part 63 in the water stop member 60 can be formed by inserting the base material B connected to the fusion layer 22 into the cavity 53 and heating and melting the base material B.

The water stop member 60 is connected to the sheet 20 in the wiring member 10, thus when force is applied to the wire-like transmission member 30 in a direction of pulling the wire-like transmission member 30 out of the cavity 53, force applied to the end portion of the wire-like transmission member 30 is easily diffused, and concentration of stress hardly occurs in a specific position such as a locking part. A lance used to lock the terminal 40 and the connector housing 50 is assumed to be the locking part, for example.

The water stop member 60 includes the intervention part 64 intervening between the insulation barrel 44 and the covering layer 34 in the covering crimping part 38. Accordingly, the filling part 63 hardly comes out of the cavity 53. When the sheet-like base material B is used as the filling material, for example, for providing the intervention part 64, the base material B can cover the periphery of the wire-like transmission member 30, and furthermore, the terminal 40 can be fused to the periphery of the base material B. Accordingly, the base material B can be easily kept in a state of covering the periphery of the wire-like transmission member 30. The base material B covers the periphery of the wire-like transmission member 30 before being heated and melted, thus when the base material B is heated and melted to flow to fill the cavity 53, a gap hardly occurs between the cavity 53 and the wire-like transmission member 30.

A boundary portion between the inner portion 62 and the outer portion 70 has the shape corresponding to the inner surface of the cavity 53. Accordingly, it is easily confirmed that the filling part 63 is provided to the inner portion 62.

The melting point of the water stop member 60 is lower than that of the covering layer 34 of the wire-like transmission member 30. Accordingly, the filling material (base material B) can be melted without melting the covering layer 34 as much as possible at a time of heating the filling material (base material B).

The water stop member 60 is a partially-extended part of the fusion layer 22. Accordingly, the fusion layer 22 and the water stop member 60 need not be provided as different members, thus reduction in the number of the members is achieved.

Embodiment 2

Figure 10:
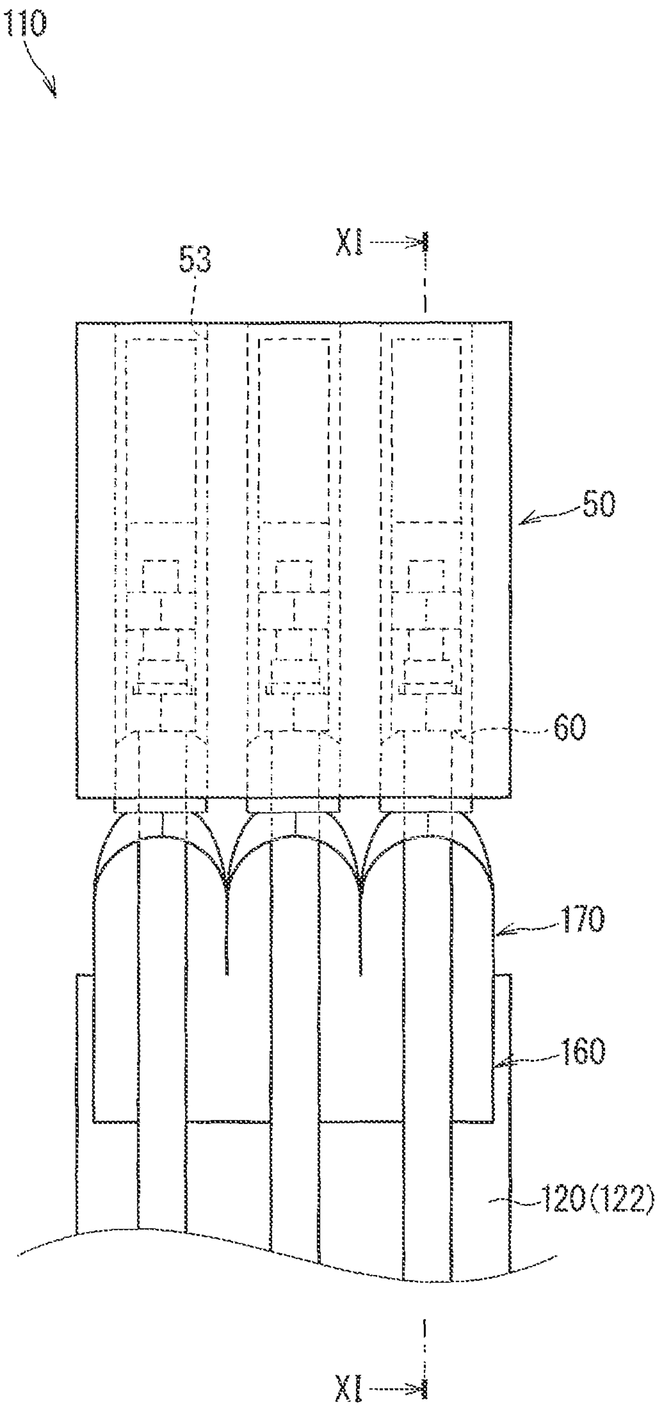
FIG. 10 is a plan view illustrating a wiring member according to an embodiment 2.
Figure 11:
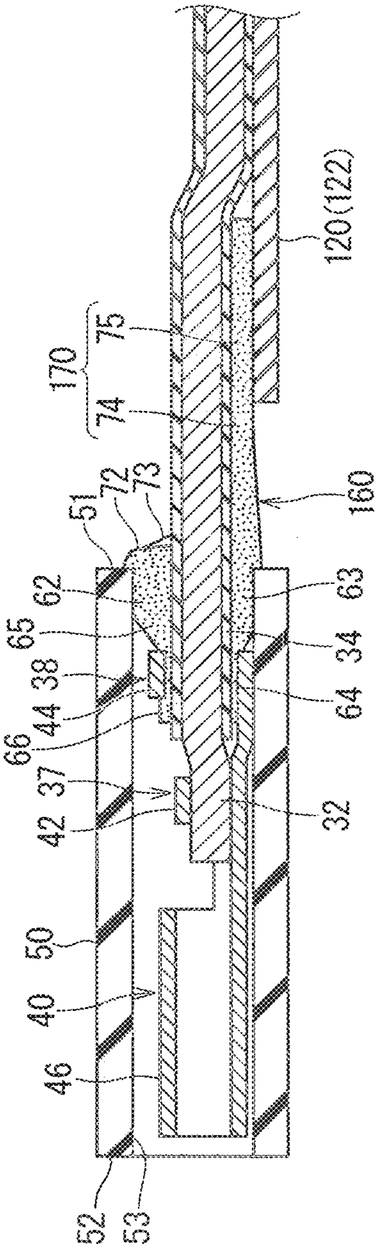
FIG. 11 is a cross-sectional view of the wiring member cut along an XI-XI line in FIG. 10.

A wiring member according to an embodiment 2 is described. FIG. 10 is a plan view illustrating a wiring member 110 according to the embodiment 2. FIG. 11 is a cross-sectional view of the wiring member cut along an XI-XI line in FIG. 10. In the following description of the present embodiment, the same reference numerals are assigned to the similar constituent elements described above, and the description thereof will be omitted.

The wiring member 110 is different from the wiring member 10 described above in that a water stop member 160 and a fusion layer 122 are different members. An outer portion 170 is bonded to a sheet 120 in the water stop member 160.

A bonding state of the outer portion 170 and the sheet 120 is not particularly limited. For example, the outer portion 170 and the sheet 120 may be fused to each other. In this case, the outer portion 170 may be fused to the fusion layer 122 of the sheet 120. When the sheet 120 includes an additional layer, the outer portion 170 may be fused to the additional layer. The outer portion 170 and the sheet 120 may be bonded via an adhesive member such as an adhesive agent or a double-sided adhesive tape. The outer portion 170 and the sheet 120 may be mechanically bonded to each other via a mechanical joining member such as a clip or a rivet.

The sheet 120 and the outer portion 170 are stacked while main surfaces thereof are overlapped with each other. Herein, the outer portion 170 is overlapped with a surface of the sheet 120 where the electrical wire 30 is disposed. A portion of the outer portion 170 overlapped with the sheet 120 is located between the electrical wire 30 and the sheet 120. The outer portion 170 may be overlapped with a surface of the sheet 120 on a side opposite to the surface thereof where the electrical wire 30 is disposed.

Herein, the outer portion 170 includes a first portion 74 and a second portion 75. The first portion 74 is a portion continuing into the inner portion 62. The first portion 74 is individually provided to each electrical wire 30. Accordingly, the same number (herein, the plurality) of the first portions 74 as the electrical wires 30 are provided. The second portion 75 is a portion continuing into the plurality of first portions 74. The plurality of first portions 74 are connected to each other via the second portion 75. It can also be considered that the first portion 74 corresponds to the outer portion 70 in the embodiment 1, and the other end portion 72 in the first portion 74 continues into the second portion 75 in place of the fusion layer 22. A configuration of one end portion, the other end portion, and an intermediate portion in the first portion 74 is similar to that of one end portion 71, the other end portion 72, and the intermediate portion 73 in the outer portion 70. The second portion 75 is bonded to the sheet 120. However, the outer portion 170 may not include the second portion 75. The other end portion of each of the plurality of first portions 74 may be individually bonded to the sheet 120.

Also according to the wiring member 110 of the present example, the effect similar to the wiring member 10 described above can be obtained except that the water stop member 60 and the fusion layer 22 are integrally formed. According to the wiring member 110 of the present example, the water stop member 160 and the fusion layer 122 are the different members, thus a physical property of the water stop member 160 and a physical property of the fusion layer 122 can be easily made to be different from each other, and a material suitable for each member is easily selected. The melting point of the water stop member 160 can be easily lower than that of the covering layer 34 of the wire-like transmission member 30.

For example, the melting point of the water stop member 160 may be lower than that of the fusion layer 122. Accordingly, a filling material can be melted without melting the fusion layer 122 as much as possible at a time of heating the filling material. Accordingly, deformation of the fusion layer 122 can be suppressed, and dissolution of the fusion state between the fusion layer 122 and the wire-like transmission member 30 can be suppressed.

When a member in which a base material (base material to be eventually the water stop member 60) different from the sheet 120 and the sheet 120 are bonded is prepared in place of the base material B in the method of manufacturing the wiring member 10 according to the embodiment 1, then the wiring member 110 can be manufactured using the manufacturing method similar to that of the wiring member 10 according to the embodiment 1.

Modification Example

Also in the case where the fusion layer 22 and the water stop member 60 are integrally formed as with the wiring member 10 according to the embodiment 1, the melting point of the water stop member 60 may be lower than that of the fusion layer 22 as with the wiring member 110 according to the embodiment 2. For example, it is also considered that a component is changed between a portion to be the water stop member 60 and a portion to be the fusion layer 22 in the base material B before being processed to be eventually the fusion layer 22 and the water stop member 60 to make the melting point of the portion to be the water stop member 60 be lower than that of the fusion layer 22. However, in the wiring member 10 according to the embodiment 1 and the wiring member 110 according to the embodiment 2, the melting point of each of the water stop members 60 and 160 may be equal to or higher than that of each of the fusion layers 22 and 122.

In the above description, the water stop member 60 includes the intervention part 64, however, this configuration is not necessary. The water stop member 60 may not include the intervention part 64. In this case, the base material B may be or may not be temporarily held in the end portion of the electrical wire 30 before being inserted into the cavity 53. When the base material B is temporarily held in the end portion of the electrical wire 30 before being inserted into the cavity 53, for example, the base material B may be fused or bonded to the end portion of the electrical wire 30. For example, it is also applicable that the base material B is wound around the end portion of the electrical wire 30 for one or more rounds, thus a portion where one side portion and the other side portion of the base material B are overlapped with each other is provided, and the overlapped portion is fused or bonded.

In the above description, the melting point of the water stop member 60 is lower than that of the covering layer 34, however, this configuration is not necessary. The melting point of the water stop member 60 may be equal to or higher than that of the covering layer 34.

In the above description, the boundary portion between the inner portion 62 and the outer portion 70 has the outer shape corresponding to the inner surface of the cavity 53, however, this configuration is not necessary. For example, a magnitude of the outer shape at the boundary portion between the inner portion 62 and the outer portion 70 may be smaller than that of the inner surface of the cavity 53. For example, it is also applicable that one side portion and the other side portion of the base material B are not fused to each other in the end portion of the outer portion 70 continuing into the filling part 63, but are separated from each other.

In the above description, the connector housing 50 includes only one stage of row of the cavity 53, however, this configuration is not necessary. Also applicable is a connector housing includes multiple stages of row of a cavity. In this case, it is also applicable that a set of a sheet and an electrical wire is provided for each stage of a cavity, and plural sets of the sheet and the electrical wire are stacked on each other. It is also applicable that the number of a set of a sheet and an electrical wire is one, and the electrical wire fused to one sheet is separately housed in plural stages of cavity.

The configurations described in the embodiments and modification examples thereof can be appropriately combined as long as they are not contradictory.

EXPLANATION OF REFERENCE SIGNS

10, 110 wiring member
20, 120 sheet
22, 122 fusion layer
30 electrical wire (wire-like transmission member)
32 core wire
34 covering layer
36 terminal crimping part
37 core wire crimping part
38 covering crimping part
40 terminal
42 wire barrel
44 insulation barrel
46 other side connection part
50 connector housing
51 one main surface
52 other main surface
53 cavity
60, 160 water stop member
62 inner portion
63 filling part
64 intervention part
65 connection part
66 protrusion part
70, 170 outer portion
71 one end portion
72 other end portion
73 intermediate portion
74 first portion
75 second portion
B base material
D divided portion
S slit

The invention claimed is:

1. A wiring member, comprising:
a sheet including a fusion layer having a planar shape;
a wire-like transmission member fused to the fusion layer;
a connector housing in which a cavity housing an end portion of the wire-like transmission member is formed; and
a water stop member stopping water between a wall part of the cavity and the end portion of the wire-like transmission member, wherein
the water stop member includes an inner portion located in the cavity and an outer portion continuing into the inner portion to be located on an outer side of the cavity,
provided to the inner portion is a filling portion made up of a resin material thermally deformed to fill the cavity,
the outer portion is connected to the sheet,
the outer portion includes a first end portion connected to the sheet, a second end portion connected to the inner portion, and an intermediate portion connecting between the first end portion and the second end portion,
the first end portion keeps flat and covers only one side of the wire-like transmission member,
the second end portion entirely covers a periphery of the wire-like transmission member, and
the intermediate portion increases a region covering the periphery of the wire-like transmission member from the first end portion toward the second end portion.

2. The wiring member according to claim 1, wherein
provided is a terminal crimping part in which a terminal is crimped to the end portion of the wire-like transmission member,
the terminal crimping part includes a covering crimping part in which an insulation barrel in the terminal is crimped to a covering layer in the wire-like transmission member, and the inner portion includes an intervention part intervening between the insulation barrel and the covering layer in the covering crimping part.

3. The wiring member according to claim 1, wherein a melting point of the water stop member is lower than a melting point of a covering layer of the wire-like transmission member.

4. The wiring member according to claim 1, wherein a melting point of the water stop member is lower than a melting point of the fusion layer.

5. The wiring member according to claim 1, wherein a boundary portion between the inner portion and the outer portion has an outer shape corresponding to an inner surface of the cavity.

6. The wiring member according to claim 1, wherein the water stop member is a partially-extended part of the fusion layer.

7. The wiring member according to claim 1, wherein the water stop member is a member different from the fusion layer, and the outer portion is bonded to the sheet.

* * * * *